United States Patent
Komulainen et al.

(10) Patent No.: US 7,275,021 B2
(45) Date of Patent: Sep. 25, 2007

(54) MEASURING METHOD AND ARRANGEMENT

(75) Inventors: Risto Komulainen, Klaukkala (FI); Jorma Vesti, Vaasa (FI); Stefan Strandberg, Vörå (FI)

(73) Assignee: Vacon Oyj, Vassa (FI)

( * ) Notice: Subject to any disclaimer, the term of this patent is extended or adjusted under 35 U.S.C. 154(b) by 0 days.

(21) Appl. No.: 11/284,891

(22) Filed: Nov. 23, 2005

(65) Prior Publication Data

US 2006/0116831 A1 Jun. 1, 2006

(30) Foreign Application Priority Data

Nov. 26, 2004 (FI) ............................... 20041521 U

(51) Int. Cl.
*G06F 19/00* (2006.01)
(52) U.S. Cl. ..................................... 702/189; 324/76.11
(58) Field of Classification Search .................. 702/33, 702/38, 64–65, 69, 182–185; 324/76.11
See application file for complete search history.

(56) References Cited

U.S. PATENT DOCUMENTS

| 5,877,950 A | 3/1999 | Bonsignour et al. |
| 6,021,057 A | 2/2000 | Linden et al. |
| 2003/0151932 A1 | 8/2003 | Bode et al. |
| 2004/0199267 A1 | 10/2004 | Hammer et al. |
| 2006/0034326 A1* | 2/2006 | Anderson et al. ............ 370/466 |
| 2006/0279970 A1* | 12/2006 | Kernahan ..................... 363/65 |

FOREIGN PATENT DOCUMENTS

| EP | 0 128 492 A2 | 12/1984 |
| FR | 2 830 138 A1 | 3/2003 |
| JP | 59-50773 A | 3/1984 |
| JP | 61-10984 A | 1/1986 |
| JP | 3-109699 A | 5/1991 |

\* cited by examiner

*Primary Examiner*—Edward Raymond
(74) *Attorney, Agent, or Firm*—Birch, Stewart, Kolasch & Birch, LLP

(57) ABSTRACT

A method and a system for measuring a quantity, such as current, of a power converter apparatus including parallel-connected power converter units. A component quantity, of each power converter unit is measured, transmitted digitally in serial communication format to a control unit (CU), and summed to produce a summed quantity. The component quantity data are transmitted to the control unit with the least significant bit (LSB) first. The summing is started as soon as the LSBs of the component quantities have been received. The LSB of the sum is transmitted further as soon as the LSBs of the component quantities have been summed. After this, the rest of the bits are summed in the order of arrival, with the most significant bit (MSB) last. The respective summing data are transmitted further in the order of arrival as soon as the corresponding bits of the component quantities have been summed.

9 Claims, 2 Drawing Sheets

MEASURING METHOD AND ARRANGEMENT

BACKGROUND OF THE INVENTION

1. Field of the Invention

The present invention relates to a method and arrangement for the processing of quantities, such as current, voltage, power or moment, measured or calculated by a power converter apparatus consisting of power converter units, e.g. for generating a summed or average quantity. For the sake of simplicity, in the following description of the invention only current is considered, but the same method and system can as well be applied to the processing of other quantities, too.

The invention relates e.g. to an arrangement where a high-power frequency converter apparatus consists of a plurality of parallel-connected lower-power frequency converter or inverter units. In such an arrangement, the component current of each frequency converter is measured, and these currents are then summed e.g. to regulate the load, such as an alternating-current motor, connected to the frequency converter apparatus.

2. Discussion of the Background

For parallel connection of frequency converter units controlling an alternating-current motor, it is necessary that the component load currents measured by the power units be summed in order that the motor regulating function active in the control unit should get correct information regarding the motor current. When a prior-art solution is used, this results in a delay problem in data transfer, because the data regarding the component currents are first received in a summing unit, added together and only the summed current data is transmitted to the control unit. In parallel connection, data transfer is thus slowed down at least by the delay caused by the summing and retransmission, which at the same time also results in slower motor regulation.

SUMMARY OF THE INVENTION

The object of the present invention is to overcome the drawbacks of prior art and to create a solution for reducing the delay in the measurement of the current of parallel-connected power converter units.

In the present invention, the current data are transmitted between the power units and the control unit by using a digital serial communication method as follows:
 the current data are scaled so that they are always of the same sign regardless of the direction of current, and
 the current data are transmitted in "reverse order", i.e. with the least significant bit LSB first.

At the receiving end, the summing of the current data and further transmission of the summed current are started one bit at a time as soon as the LSBs of the component currents have been received, in such manner that
 as soon as the LSBs of the component currents have been summed, the LSB of the summed current is transmitted further to the control unit
 the rest of the bits and the respective summing data are processed in the same way in the order of arrival, with the most significant bit (MSB) last.

In this way, the data transfer delay caused by the summing can be minimized, and its minimum duration in the solution of the invention is only as long as the time it takes to compute the sum of the bits, in practice a few clock cycles. It should be noted that the dynamic summing in reverse order according to this method requires that all the component currents be of the same sign, which is achieved e.g. by adding to all the component currents 50% of their measuring range.

The advantages achieved by the solution of the invention include the following:
 in respect of the current data received by the common control unit, the power converter always looks the same regardless of whether power converters are connected in parallel or not,
 the same serial communication rate that is sufficient in the case of an individual power converter is also sufficient when several power converters are connected in parallel, and therefore no expensive special solutions are needed.

BRIEF DESCRIPTION OF THE DRAWINGS

In the following, the invention will be described in detail with reference to an example and the attached drawings, wherein.

DETAILED DESCRIPTION OF THE PREFERRED EMBODIMENTS

Figure 1:
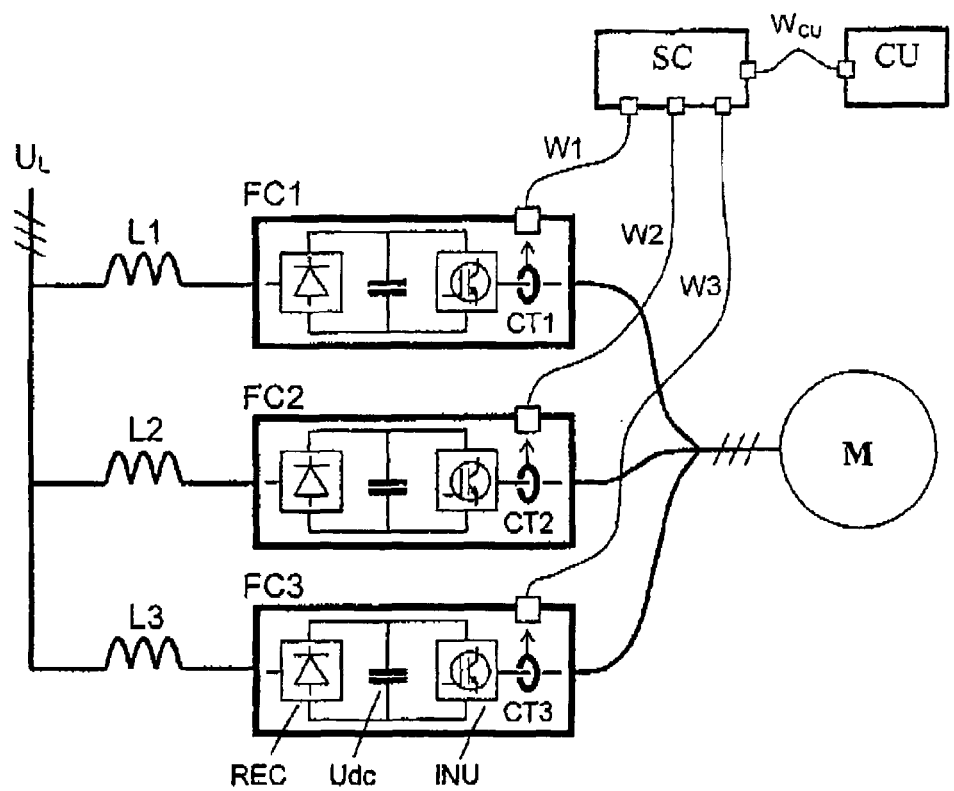
FIG. 1 presents a frequency converter apparatus consisting of a number of frequency converter units and a motor connected to it.

FIG. 1 presents a three-phase voltage-controlled high-power frequency converter apparatus and its load, a three-phase motor M, which may be e.g. a cage induction motor. The frequency converter apparatus feeds a variable-frequency three-phase alternating voltage into the motor M to control is speed of rotation. The frequency converter apparatus contains three parallel-connected frequency converter units FC1-FC3, each of which comprises a mains bridge REC, a direct-voltage intermediate circuit Udc and a load bridge INU. The frequency converter units are connected to a common three-phase alternating voltage network UL via inductor units L1-L3. In addition, the apparatus comprises a common digital control unit CU for controlling the power semiconductor switches, e.g. IGBTs of the load bridge of the frequency converter and for regulating the motor M, among other things, and a summing unit SC, which functions as a transmission unit between the frequency converter units and the control unit.

Connected to the summing unit are control cables W1-W3 (serial communication bus) from each frequency converter unit, and a control cable $W_{CU}$ is provided between it and the control unit. Each frequency converter unit contains a measuring unit CT1, CT2, CT3 for measuring the outgoing phase current, and the current measurement data obtained from the measuring units is passed in digital form to the summing unit SC and further as current measurement data summed from the component currents to the control unit CU.

Figure 2:
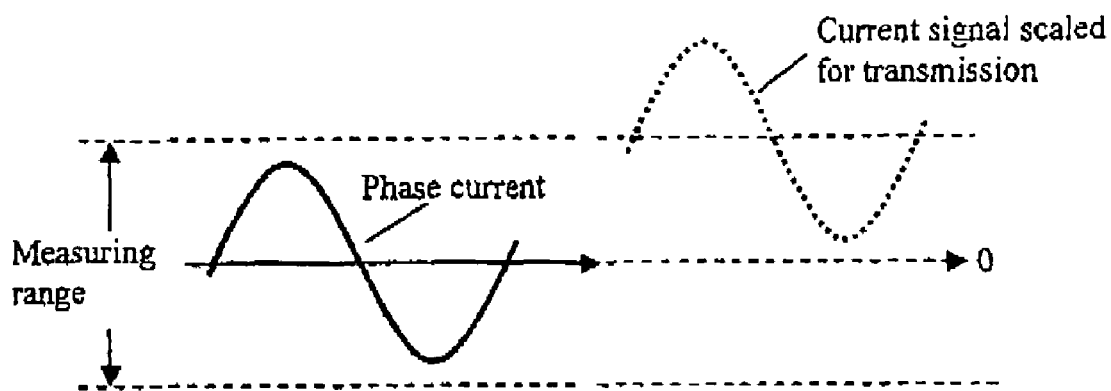
FIG. 2 illustrates the scaling of the output phase current.

According to the present invention, the extra delay required by the summing of the current can be minimized as follows:

1) The frequency converter units FC1-FC3 transmit their current data to the summing unit SC in accordance with FIG. 2 in such manner that:

the current data are scaled so that they are always of the same sign, e.g. by summing 50% of the measuring range to them, the data thus being always positive, and the current data is transmitted "in reverse order" in such manner that the least significant bit LSB is transmitted first and the most significant bit MSB and the message checksum CRC last.

Figure 3:
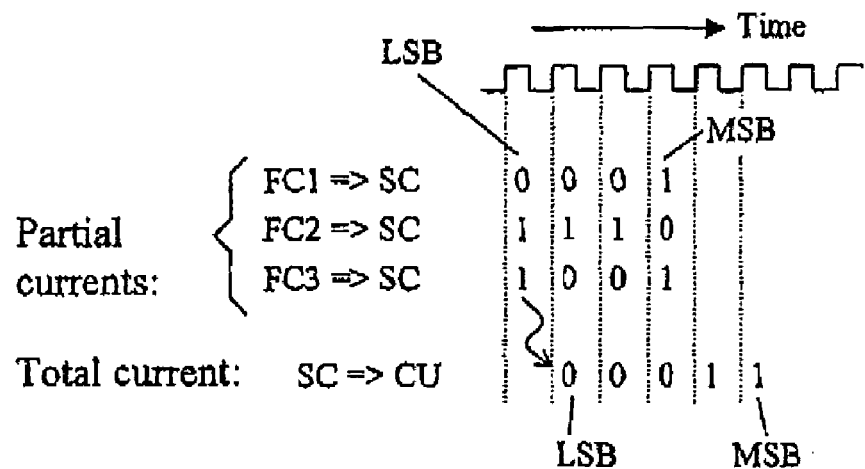
FIG. 3 illustrates summing of the current and further transmission of the sum data.

2) The summing unit SC takes care of the summing and the further transmission of the summed current to the CU in the manner illustrated in FIG. 3 as follows:

once the SC has summed the LSBs of the component currents, it immediately transmits the LSB of the summed current further similarly, the SC processes the other current data bits in the order of their arrival, so the minimum duration of the delay required by the summing is only as long as the time it takes to compute the sum of the equivalent bits the checksum CRC belonging to the end of the serial communication message is also processed on the same principle; once the CRCs of the FC-specific messages have been checked, the CRC of the summed message is finally transmitted further.

3) The scaling term for the component currents, e.g. 50% of the measuring range, can be subtracted from the summed current either in the summing unit or in the control unit.

Figure 1A:
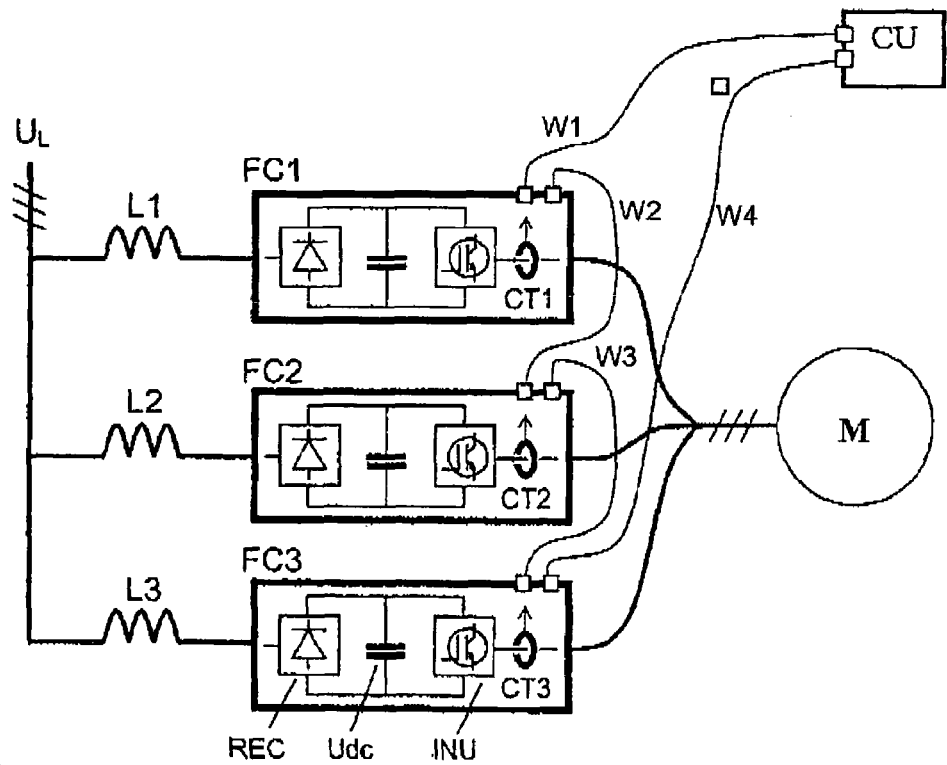
FIG. 1a presents another frequency converter apparatus consisting of a number of frequency converter units and a motor connected to it.

The same above-described summing method can also be applied in a frequency converter apparatus as presented in FIG. 1a, where the data transfer between the frequency converters has been arranged as a circle, so that no summing unit is needed at all. In this arrangement, the summing of the current data and their transmission to the control unit are accomplished e.g. as follows:

1) The control unit sends via control cable W4 a request to frequency converter FC3 to return the summed current data
2) FC3 sends its current data to FC2 via control cable W3
3) FC2 sums its current data by the procedure of the present invention to the received current data of FC3 and sends the summed current data further to FC1 via control cable W2
4) FC1 adds its current data by the same method to the previous summed current data and transmits the total current sum to the control unit CU via control cable W1.

It is obvious to the person skilled in the art that different embodiments of the invention are not limited to the example described above, but that they may be varied within the scope of the claims presented below. The same reverse summing may provide an advantage in the processing of other signals as well. For example, the same method can be used to calculate the sum of the powers or moments of the units or the mean value of their voltages or the like.

The invention claimed is:

1. A method for measuring a quantity of a power converter apparatus consisting of parallel-connected power converter units wherein a component quantity of each power converter unit is measured, the component quantities are transmitted digitally in serial communication format to a control unit, and the component quantities are summed to produce a summed quantity, in the method comprising: transmitting the component quantity data to the control unit with the least significant bit (LSB) first, starting the summing as soon as the LSBs of the component quantities have been received, transmitting the LSB of the sum further as soon as the LSBs of the component quantities have been summed, summing the rest of the bits in the order of arrival, with the most significant bit last, and transmitting the respective summing data further in the order of arrival as soon as the corresponding bits of the component quantities have been summed, wherein the converter units transmit their respective data to be summed in such manner that the data are scaled to make them equal in sign, by adding 50% of the measuring range to them, the data thus being always positive.

2. A method according to claim 1, further comprising:
checking the checksums, CRCs, of the messages of the converter units,
transmitting the checksum CRC of the summed message further.

3. A system for measuring the current of a power converter apparatus consisting of parallel-connected power converter units, said system comprising: converter-unit-specific measuring and computing elements, which are used to produce a component quantity of each power converter unit, communication elements, by means of which the component quantities are transmitted digitally in serial communication format at least to a control unit, and summing elements, by means of which the component quantities are summed to produce a summed quantity, the component quantity data being transmitted to the control unit with the least significant bit (LSB) first, the summing being started as soon as the LSBs of the component quantities have been received the LSB of the sum quantity being transmitted further as soon as the LSBs of the component quantities have been summed, after this, the rest of the bits being summed in the order of arrival, with the most significant bit last, and the respective summing data being transmitted further in the order of arrival as soon as the corresponding bits of the component quantities have been summed, further comprising scaling means the converter units transmit transmitting their respective data to be summed in such manner that the data are scaled to make them equal in sign by adding 50% of the measuring range to them, the data thus being always positive.

4. A system according to claim 3, wherein the power converter apparatus is a frequency converter apparatus containing frequency converter units.

5. A system according to claim 3, wherein the power converter apparatus is an inverter apparatus containing inverter units.

6. A system according to claim 3, wherein the communication elements are arranged in circular form and the component quantities are transmitted by means of them digitally in serial communication format to the other power converter units and to the control unit.

7. A system according to claim 6, further comprising scaling means, the converter units transmitting their respective data to be summed in such manner that the data are scaled to make them equal in sign by adding 50% of the measuring range to them, the data thus being always positive.

8. A system according to claim 6, wherein the power converter apparatus is a frequency converter apparatus containing frequency converter units.

9. A system according to claim 6, the power converter apparatus is an inverter apparatus containing inverter units.

* * * * *